United States Patent
Foo et al.

(10) Patent No.: US 8,118,130 B2
(45) Date of Patent: Feb. 21, 2012

(54) METHOD AND APPARATUS FOR CONTROLLING AN ACTUATABLE RESTRAINING DEVICE USING XY CRUSH-ZONE SATELLITE ACCELEROMETERS

(75) Inventors: Chek-Peng Foo, Ann Arbor, MI (US); Huahn-Fern Yeh, Novi, MI (US); Kevin Daniel Weiss, Farmington Hills, MI (US); Yaosying Kwang, Novi, MI (US); Kazuki Shiozawa, Ann Arbor, MI (US)

(73) Assignee: TRW Automotive U. S. LLC, Livonia, MI (US)

( * ) Notice: Subject to any disclaimer, the term of this patent is extended or adjusted under 35 U.S.C. 154(b) by 790 days.

(21) Appl. No.: 11/416,674

(22) Filed: May 3, 2006

(65) Prior Publication Data

US 2006/0254848 A1    Nov. 16, 2006

Related U.S. Application Data

(60) Provisional application No. 60/679,586, filed on May 10, 2005.

(51) Int. Cl.
*B60K 28/10* (2006.01)
(52) U.S. Cl. ............ 180/274; 280/735; 701/45
(58) Field of Classification Search .......... 180/274, 180/282; 280/735; 701/45
See application file for complete search history.

(56) References Cited

U.S. PATENT DOCUMENTS

| | | | |
|---|---|---|---|
| 5,484,166 A | 1/1996 | Mazur et al. | |
| 5,935,182 A | 8/1999 | Foo et al. | |
| 6,036,225 A | 3/2000 | Foo et al. | |
| 6,186,539 B1 | 2/2001 | Foo et al. | |
| 6,282,474 B1 | 8/2001 | Chou et al. | |
| 6,529,810 B2 | 3/2003 | Foo et al. | |
| 6,540,255 B1 * | 4/2003 | Blank et al. | 280/735 |
| 6,776,435 B2 | 8/2004 | Foo et al. | |
| 6,863,302 B2 * | 3/2005 | Stopczynski | 280/735 |
| 6,986,529 B2 * | 1/2006 | Fischer | 280/735 |

FOREIGN PATENT DOCUMENTS

| | | |
|---|---|---|
| DE | 197 51 336 A1 | 6/1998 |
| DE | 197 40 019 A1 | 3/1999 |
| DE | 199 04 367 A1 | 8/1999 |
| DE | 198 16 989 A1 | 11/1999 |
| DE | 100 44 918 A1 | 3/2002 |
| DE | 102 44 095 A1 | 4/2004 |
| WO | WO-2004/020254 A1 | 3/2004 |

OTHER PUBLICATIONS

U.S. Foo et al. U.S. Appl. No. 11/416,675, filed May 3, 2006 entitled "Method and Apparatus for Controlling an Actuatable Restraining Device Using XY Side Satellite Accelerometers."

* cited by examiner

*Primary Examiner* — Eric Culbreth
(74) *Attorney, Agent, or Firm* — Tarolli, Sundheim, Covell & Tummino LLP

(57) ABSTRACT

An apparatus is provided for controlling a vehicle actuatable occupant restraining system including a central crash accelerometer sensing crash acceleration at a central vehicle location and providing a first crash acceleration signal indicative thereof. A crush zone crash accelerometer senses transverse crash acceleration at a forward location of the vehicle. A controller actuates the actuatable occupant restraining system in response to the central crash acceleration signal and the transverse crash acceleration signal from the crush zone sensor.

8 Claims, 5 Drawing Sheets

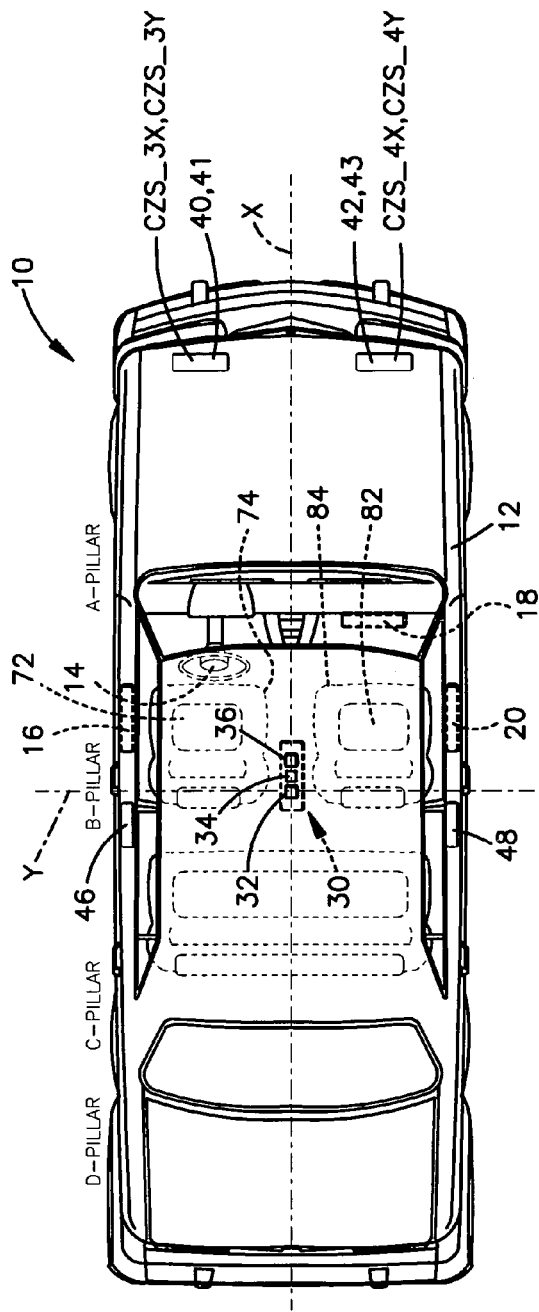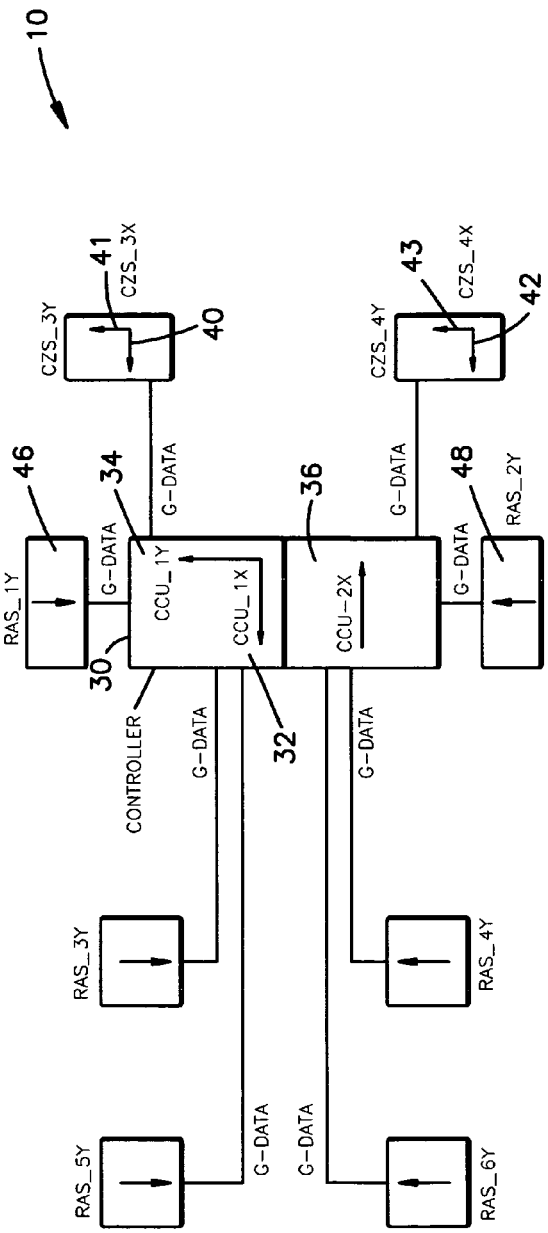
Fig.1
Fig.2

METHOD AND APPARATUS FOR CONTROLLING AN ACTUATABLE RESTRAINING DEVICE USING XY CRUSH-ZONE SATELLITE ACCELEROMETERS

RELATED APPLICATION

This application claims the benefit of U.S. Provisional Application No. 60/679,586, filed May 10, 2005.

FIELD OF THE INVENTION

The present invention relates to a method and apparatus for controlling a vehicle actuatable occupant restraining device. in particular, the arrangement in accordance with the present invention, permits enhanced detection of offset deformable barrier, oblique/angular, and pole crash events.

BACKGROUND OF THE INVENTION

Air bag restraining systems in vehicles for vehicle occupants are known in the art. An air bag restraining device may include a multistage inflator where the stages are actuated at different times in response to vehicle crash conditions.

U.S. Pat. No. 5,935,182 to Foo et al., assigned to TRW Inc., discloses a method and apparatus for discriminating a vehicle crash condition using virtual sensing. U.S. Pat. No. 6,036,225 to Foo et al., assigned to TRW Inc., discloses a method and apparatus for controlling a multistage actuatable restraining system in a vehicle using crash severity index values. U.S. Pat. No. 6,186,539 to Foo et al., also assigned to TRW Inc., discloses a method and apparatus for controlling a multistage actuatable restraining device using crash severity indexing and crush-zone sensors. U.S. Pat. No. 6,529,810 to Foo et al., also assigned to TRW Inc., discloses a method and apparatus for controlling an actuatable multistage restraining device using switched thresholds based on transverse acceleration.

SUMMARY OF THE INVENTION

The present invention is directed to a method and apparatus for controlling a vehicle multistage actuatable occupant restraining system using XY crush-zone satellite accelerometers.

An apparatus is provided for controlling a vehicle actuatable occupant restraining system comprising a central crash accelerometer sensing crash acceleration at a central vehicle location and providing a first crash acceleration signal indicative thereof. The apparatus further comprises a crush zone crash accelerometer sensing transverse crash acceleration at a forward location of the vehicle, and a controller for actuating the actuatable occupant restraining system in response to the central crash acceleration signal and the transverse crash acceleration signal from the crush zone sensor.

A method is provided for controlling a vehicle actuatable occupant restraining system comprising the steps of sensing crash acceleration at a central vehicle location, sensing transverse crash acceleration at a forward location of the vehicle, and actuating the actuatable occupant restraining system in response to the sensed central crash acceleration and the sensed transverse crash acceleration.

BRIEF DESCRIPTION OF THE DRAWINGS

The foregoing and other features and advantages of the invention will become apparent to one skilled in the art upon consideration of the following description of the invention and the accompanying drawings in which:

FIG. 1 is a schematic diagram of a vehicle having an actuatable occupant restraining system with a control arrangement in accordance with an exemplary embodiment of the present invention;

FIG. 2 is a schematic block diagram of the actuatable occupant restraining system shown in FIG. 1 showing the crash sensing accelerometers in more detail;

DETAILED DESCRIPTION

Figure 3:
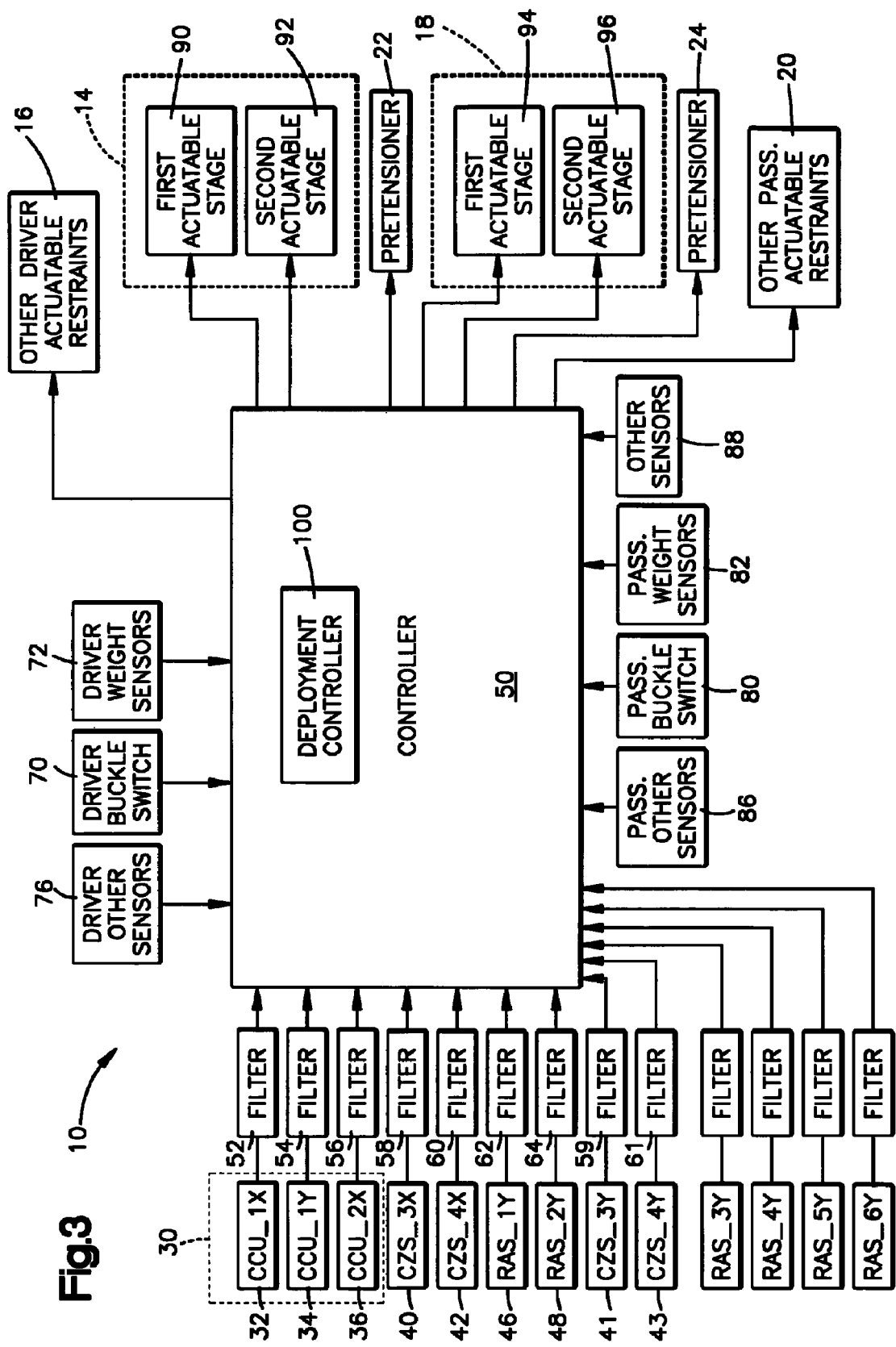
FIG. 3 is an electrical schematic block diagram of the actuatable occupant restraining system shown in FIG. 1.

Referring to FIGS. 1-3, an actuatable occupant restraining system 10, in accordance with the present invention, in a vehicle 12, includes a driver's side, multistage, front actuatable restraining device 14, and a passenger's side, multistage, front actuatable restraining device 18. Other actuatable restraining devices could be included such as a driver's actuatable side restraining device 16 and a passenger's actuatable side restraining device 20. The actuatable occupant restraining system 10 could further include a driver's side pretensioner 22, and a passenger's side pretensioner 24. The present invention is not limited to use with an air bag restraining system. The present invention is applicable to any actuatable restraining device having multiple actuatable stages or to a plurality of actuatable restraining devices that can be simultaneously or sequentially actuated. A front air bag having plural actuatable stages is described for purposes of explanation. The invention is also applicable to a vehicle having multiple air bags wherein at least one of the air bags is a multistage air bag controlled in accordance with the present invention.

The system 10 includes at least one crash or collision sensor assembly 30 located at a substantially central location of the vehicle. Preferably, sensor assembly 30 includes a first crash acceleration sensor 32 having its axis of sensitivity substantially oriented to sense crash acceleration in the vehicle X-direction (i.e., parallel with the front-to-rear axis of the vehicle) that provides a crash acceleration signal designated CCU_1X. The sensor assembly 30 further includes a second crash acceleration sensor 34 having its axis of sensitivity substantially oriented to sense crash acceleration in the vehicle Y-direction (i.e., perpendicular to the front-to-rear axis of the vehicle) that provides a transverse crash acceleration signal designated CCU_1Y. The sensor assembly 30 further includes a third crash acceleration sensor 36 having its axis of sensitivity substantially oriented to sense crash acceleration in the vehicle X-direction (i.e., parallel with the front-to-rear axis of the vehicle) that provides a crash acceleration signal designated CCU_2X.

The crash acceleration signals from the crash sensors 32, 34, 36 can take any of several forms. Each of the crash acceleration signals can have amplitude, frequency, pulse duration, etc., or any other electrical characteristics that vary as a function of the sensed crash acceleration. In accordance with an example embodiment, the crash acceleration signals have frequency and amplitude characteristics indicative of the sensed crash acceleration.

In addition to the crash acceleration sensors 32, 34, 36, the system includes forwardly located crush-zone satellite acceleration sensors 40, 41, 42, and 43 located in a crush-zone location of the vehicle 12. The sensors 40 and 41 are in a single housing located on the driver's side of the vehicle and have an XY-axis of sensitivity substantially oriented to sense crash acceleration parallel with the vehicle's X-axis and the Y-axis, respectively. The sensors 42 and 43 are in a single housing located on the passenger's side of the vehicle and have an axis of sensitivity substantially oriented to sense crash acceleration parallel with the vehicle's X-axis and Y-axis, respectively. The signals from the driver's side, crush-zone sensors 40, 41 are designated as CZS_3X and CZS_3Y, respectively. The signals from the passenger's side, crush-zone sensors 42, 43 are designated as CZS_4X and CZS_4Y, respectively.

The signals from the crush-zone sensors 40, 41, 42, and 43 also have frequency and amplitude characteristics indicative of the crash acceleration experienced at those sensor locations of the vehicle. The crush-zone sensors are preferably mounted at or near the radiator location of the vehicle and serve to better discriminate certain types of crash conditions by supplementing the indications provided by the crash sensors 32, 34, 36. In particular, the arrangement in accordance with the present invention, permits enhanced detection of offset deformable barrier, oblique/angular, and pole crash events.

A driver's side-satellite crash acceleration sensor 46 is mounted on the driver's side of the vehicle such as at the B-pillar and has an axis of sensitivity substantially oriented to sense crash acceleration parallel with the vehicle's Y-axis. The crash acceleration sensor 46 provides a crash acceleration signal designated as RAS_1Y having frequency and amplitude characteristics indicative of crash acceleration in the Y-axis direction with acceleration into the driver's side of the vehicle having a positive value. A passenger's side-satellite crash acceleration sensor 48 is mounted on the passenger's side of the vehicle such as at the B-pillar and oriented to sense crash acceleration parallel with the vehicle's Y-axis. The crash acceleration sensor 48 provides a crash acceleration signal designated as RAS_2Y having frequency and amplitude characteristics indicative of crash acceleration in the Y-axis direction with acceleration into the passenger's side of the vehicle having a positive value. Other Y-axis satellite accelerations sensors may be mounted in the C-pillars on each side of the vehicle and the D-pillars on each side of the vehicle. If C-pillar and D-pillar acceleration sensors are used, they provide acceleration signals designated as RAS_3Y (Driver's side C-pillar), RAS_4Y (Passenger's side C-pillar), RAS_5Y (Driver's side D-pillar), and RAS_6Y (Passenger's side D-pillar). For the purposes of explanation of the present invention, it is assumed that only B-pillar side-satellite sensors are present.

The crash acceleration signals CCU_1X, CCU_1Y, CCU_2X, CZS_3X, CZS_3Y, CZS_4X, CZS_3Y, RAS_1Y, and RAS_2Y are provided to a controller 50, through associated hardware high pass/low pass filters 52, 54, 56, 58, 59, 60, 61, 62, and 64, respectively. The controller 50 is preferably a microcomputer. Although the example embodiment of the invention uses a microcomputer, the invention is not limited to the use of a microcomputer. The present invention contemplates that the functions performed by the microcomputer could be carried out by other digital and/or analog circuitry and can be assembled on one or more circuit boards or as an application specific integrated circuit ("ASIC").

The filters 52, 54, 56, 58, 59, 60, 61, 62, and 64, filter the crash acceleration signals to remove frequency components that are not useful in discriminating a vehicle crash event, e.g., frequency components resulting from road noise. Frequencies useful for crash discrimination can be determined through empirical testing of a vehicle platform of interest.

The controller 50 monitors the filtered crash acceleration signals and performs one or more crash algorithms to discriminate whether a vehicle deployment or non-deployment crash event is occurring. Each crash algorithm measures and/or determines values of the crash event from the crash acceleration signals. These values are used in deployment and actuation decisions. Such measured and/or determined crash values are also referred to as "crash metrics" and include crash acceleration, crash energy, crash velocity, crash displacement, crash jerk, etc. Based upon the crash acceleration signals, the controller 50 controls the multistage actuatable restraining devices 14, 18.

Other driver associated sensors are used to detect characteristics of the driver that are or could be used by the controller 50 in its control algorithm to control the actuatable restraining devices 14 and 16. These sensors include a driver's buckle switch sensor 70 that provides a signal to controller 50 indicating whether the driver has his seat belt buckled. Driver's weight sensors 72 located in the driver's seat 74 provide a signal indicative of the driver's sensed weight. Other driver associated sensors 76 provide other driver related information to the controller 50 such as position, height, girth, movement, etc.

Other passenger associated sensors are used to detect characteristics of the passenger that are or could be used by the controller 50 in its control algorithm to control the actuatable restraining devices 18 and 20. These sensors include a passenger's buckle switch sensor 80 that provides a signal to controller 50 indicating whether the passenger has his seat belt buckled. Passenger's weight sensors 82 located in the passenger's seat 84 provide a signal indicative of the passenger's sensed weight. Other passenger associated sensors 86 provide other occupant information to the controller 50 related to the passenger such as position, height, girth, movement, etc. Other sensors 88 provide signals to the controller 50 indicative of whether a passenger is present on the seat 84, whether a child restraining seat is present on the seat 84, etc.

In the example embodiment, the air bag restraining device 14 includes a first actuatable stage 90 and a second actuatable stage 92, e.g., two separate sources of inflation fluid in fluid communication with a single air bag restraining device 14. Each stage 90, 92, has an associated squib (not shown) that, when energized with sufficient current for a sufficient time period, initiates fluid flow from an associated fluid source. When one stage is actuated, a percentage less than 100% of the maximum possible inflation occurs. To achieve 100% inflation, the second stage must be actuated within a predetermined time of the first stage actuation. More specifically, the controller 50 performs a crash algorithm using determined crash metrics and outputs one or more signals to the actuatable restraining device 14 for effecting actuation of one or both actuatable inflation stages 90 and 92 at times to achieve a desired inflation profile and pressure. As mentioned, other actuatable restraining devices such as a pretensioner 22, or other devices such as side restraining devices 16 would be controlled in accordance with the present invention.

As mentioned, each of the actuatable stages 90, 92 includes an associated squib (not shown) of the type well known in the art. Each squib is operatively connected to an associated source of gas generating material and/or a bottle of pressurized gas. The squibs are ignited by passing a predetermined amount of electrical current through them for a predetermined time period. Each squib ignites its associated gas generating material and/or pierces its associated pressurized gas bottle. The amount of gas released into the bag is a direct function of the number of stages actuated and the timing of their actuation. The more stages actuated during predetermined time periods, the more gas present in the air bag. In accordance with an exemplary embodiment, the air bag restraining device 14 includes two actuatable stages. If only one stage is actuated, 40% of the maximum possible inflation pressure occurs. If the two stages are actuated within 5 msec. of each other, 100% of the maximum possible inflation pressure occurs. If the stages are actuated approximately 20 msec. apart, a different, lesser percentage of the maximum possible inflation occurs. By controlling the actuation timing of the multiple stages, the dynamic profile of the bag is controlled, e.g., the inflation rate, the inflation pressure, etc.

The passenger's side restraining device 18 includes a first actuatable stage 94 and a second actuatable stage 96 controlled as described above with regard to the driver's side restraining device 14 to control the percentage of maximum possible inflation pressure of the air bag.

In accordance with the present invention, a deployment controller 100 within the controller 50 controls the actuation of the first actuatable stages 90, 94 and second actuatable stages 92, 96 using determined crash metrics and other monitored sensor inputs.

Figure 4:
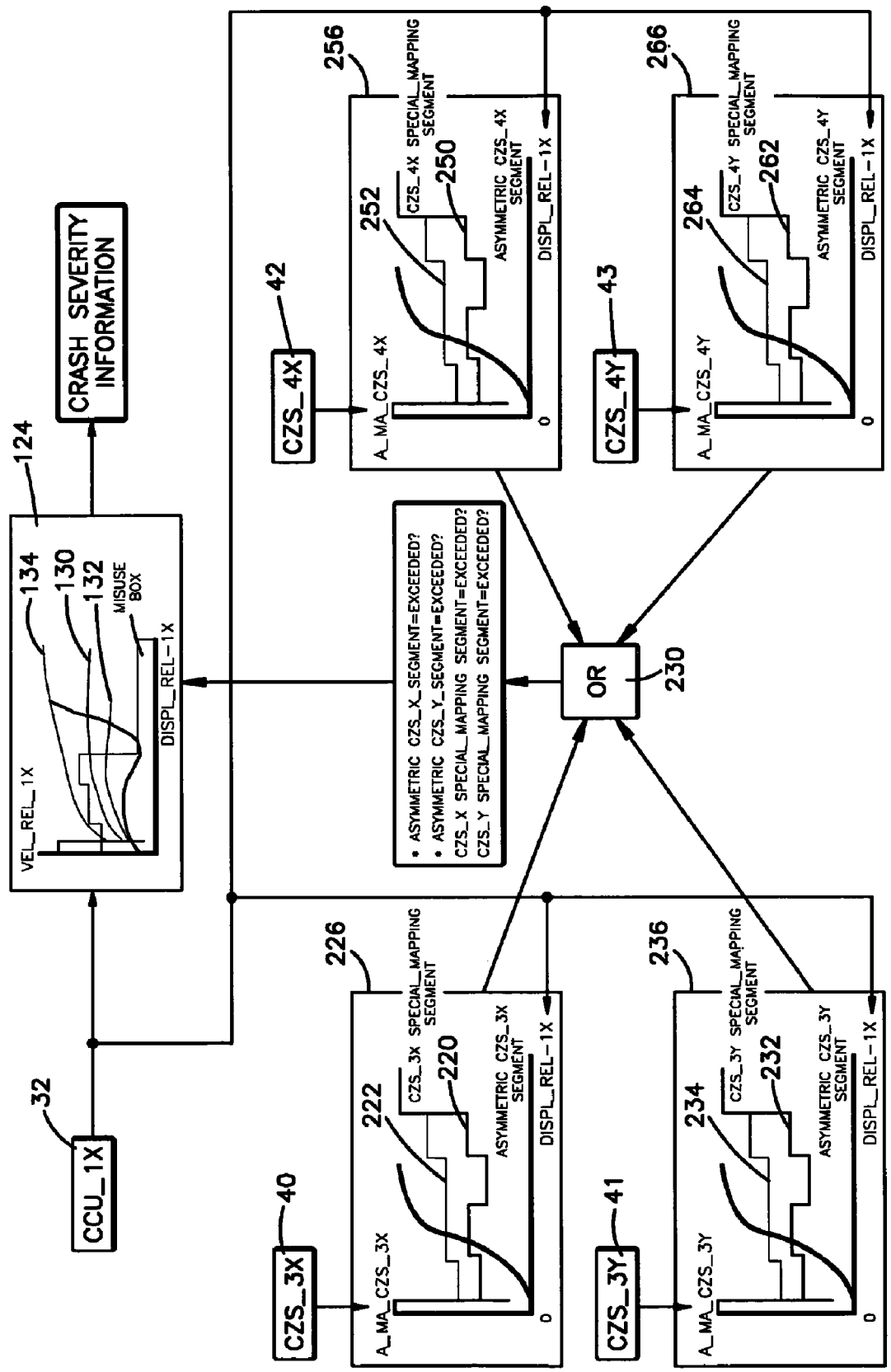
FIG. 4 shows graphical representations of determined crash related values and thresholds used in the control arrangement of the present invention.
Figure 5:
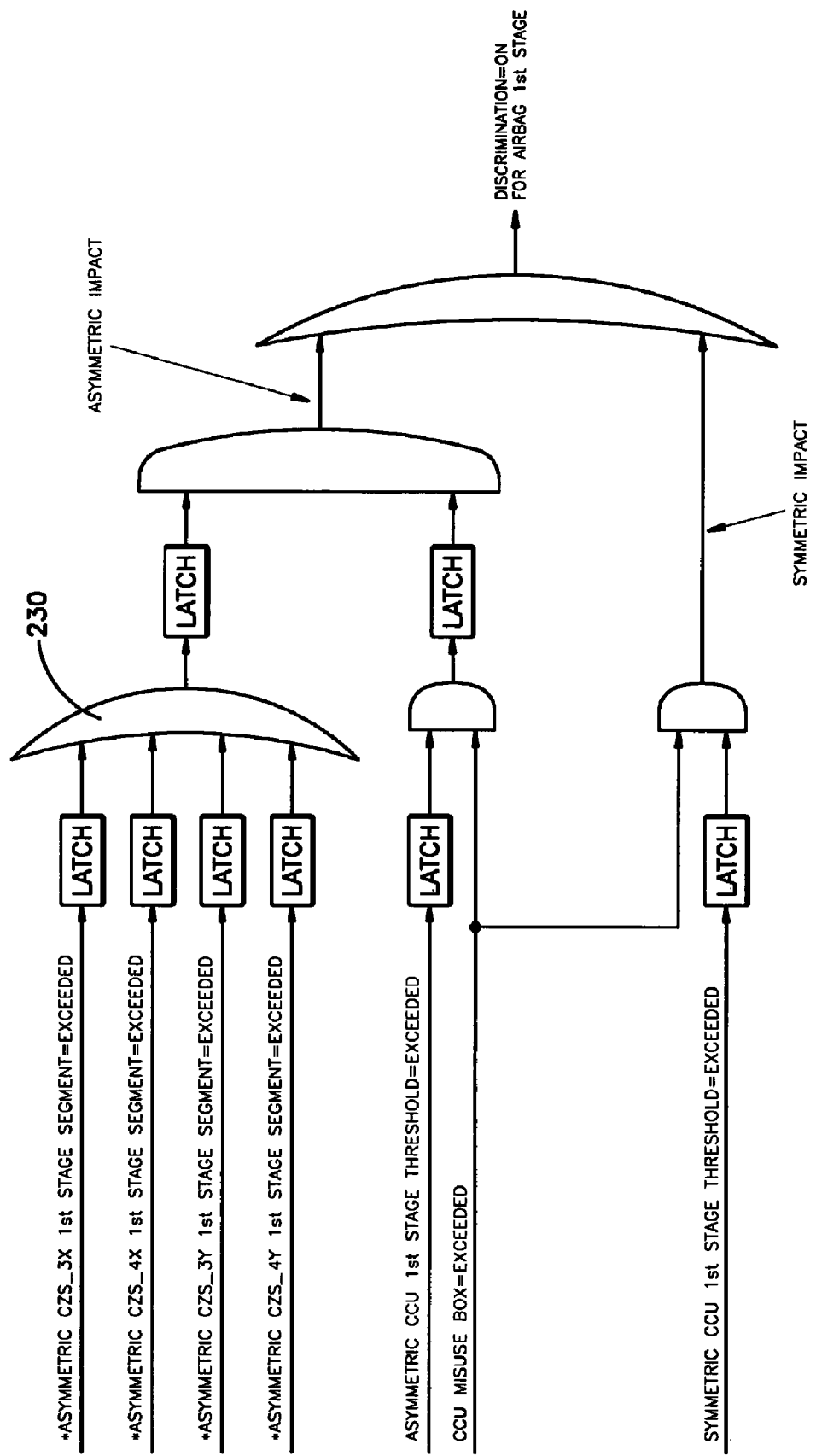
FIG. 5 is a logic diagram showing the deployment control logic using the XY crush-zone satellite accelerometers in accordance with the present invention.

Referring to FIGS. 4 and 5, the control process performed by the controller 50 to control the first and second stages will be better understood for the driver's side, multistage restraining device 14. It should be understood that the passenger's side, multistage restraining device 18 is similarly controlled with differences noted below. As mentioned, the controller 50 is, in accordance with an exemplary embodiment, a microcomputer programmed to perform these illustrated functions.

The acceleration sensor 32, an accelerometer in an exemplary embodiment, outputs an acceleration signal CCU_1X having a characteristic (e.g., frequency and amplitude) indicative of the vehicle's crash acceleration upon the occurrence of a crash event. The acceleration signal CCU_1X is filtered by, preferably, a hardware (i.e., separate from the controller 50) high-pass-filter ("HPF")/low-pass-filter ("LPF") 52 to eliminate frequencies resulting from extraneous vehicle operating events and/or input signals resulting from road noise. The frequency components removed through filtering are not indicative of the occurrence of a crash event for which deployment of the restraining device 14 is desired. Empirical testing is used to determine the frequency values of relevant crash signals for a particular vehicle platform of interest. Extraneous signal components that may be present in the crash acceleration signal are appropriately filtered and signal characteristics indicative of a deployment crash event are passed for further processing.

The accelerometer 32, in accordance with an exemplary embodiment, has a nominal sensitivity of ±100 g's (g being the value of acceleration due to earth's gravity, i.e., 32 feet per second squared or 9.8 m/s$^2$). In a multistage actuatable restraining system, it is desirable to continue sensing crash acceleration during the crash event, even after a first or initial trigger threshold is reached. Since a first stage actuation is desired upon the occurrence of crash acceleration well within ±100 g's, the further need for sensing is facilitated with the accelerometer 32 having a nominal sensitivity of ±100 g's.

The filtered output signal is provided to an analog-to-digital (converter), which is preferably internal to the controller 50 (e.g., an A/D input of a microcomputer) or an external A/D converter. The A/D converter converts the filtered crash acceleration signal into a digital signal. The output of the A/D converter is filtered preferably with another high-pass/low-pass filter having filter values empirically determined for the purpose of eliminating small drifts and offsets associated with the A/D conversion. In a microcomputer embodiment of the present invention, the filter would be digitally implemented within the microcomputer. A determination function of the controller 50 determines two crash metric values Vel_Rel_1X ("crash velocity") and Displ_Rel_1X ("crash displacement") from the filtered crash acceleration signal CCU_1X. This is done by first and second integrations of the acceleration signal from CCU_1X.

The crash displacement value and crash velocity value are preferably determined using a virtual crash sensing process fully described in U.S. Pat. No. 6,186,539 to Foo et al. and U.S. Pat. No. 6,036,225 to Foo et al. using a spring mass model of the occupant to account for spring forces and damping forces. A detailed explanation of a spring-mass model is found in U.S. Pat. No. 5,935,182 to Foo et al.

The values determined in velocity and displacement determination function are used to compare the Vel_Rel_1X value as a function of Displ_Rel_1X against crash displacement varying thresholds in a comparison function of the controller 50. The comparison function 124 compares the Vel_Rel_1X value against a LOW threshold 130 or a SWITCHED LOW threshold 132 and also compares the Vel_Rel_1X value against a HIGH threshold 134. Which of the two low thresholds 130 and 132 are selected for control of the deployment of the first stage actuation 90 of the restraining device 14 is controlled in response to a determined CZS value in either the X or Y directions compared against associated threshold values referred to herein as asymmetric CZS segment values that vary as a function of Displ_Rel_1X value as discussed below. It is desirable to, according to the present invention, deploy the first stage 90 when the Vel_Rel_1X exceeds the LOW threshold 130 or the SWITCHED LOW threshold 132 (depending on which is used by controller 50 as described below). The second stage 92 is actuated as a function of the time between a LOW (or SWITCHED LOW) threshold crossing and a HIGH threshold crossing and in accordance with a predetermined mapping function. All three thresholds 130, 132, and 134 vary as a function of the crash displacement Displ_Rel_1X value and are empirically determined for a particular vehicle platform of interest.

The controller 50 determines the time period from when the determined crash velocity value Vel_Rel_1X exceeds the LOW threshold 130 or the SWITCHED LOW threshold 132 to when it exceeds the HIGH threshold 134. This time period is referred to herein as the "Δt measurement". This value is a measure of the crash intensity. The shorter the time period, the more intense the vehicle crash. It is this measure of Δt that is used in the control actuation of the second stage 92. The second stage is not necessarily deployed at the time of the HIGH threshold crossing, but as a function of the Δt measurement in accordance with a mapping function as described below.

If the crush-zone sensors 40, 41, 42 and 43 detected certain crash events, the LOW threshold 130 is switched from the LOW threshold value 130 to the SWITCHED LOW threshold 132 to control the deployment of the first stage 90 and for the determination of the Δt measurement which is, in turn, used to control actuation of the second stage 92.

The crush-zone sensors 40, 41 may be a single XY accelerometer assembly providing signals CZS_3X and CZS_3Y having characteristics (e.g., frequency and amplitude) indicative of the vehicle's crash acceleration upon the occurrence of a crash event as sensed at the forward, front left location of the vehicle in directions along the vehicle's X and Y axis. The acceleration signal CZS_3X is filtered by, preferably, a hardware high-pass-filter ("HPF")/low-pass-filter ("LPF") 58 to eliminate frequencies resulting from extraneous vehicle operating events and/or inputs resulting from road noise. The frequency components removed through filtering are those frequencies not indicative of the occurrence of a crash event. Similarly, CZS_3Y is filter by HPF 59. Empirical testing is used to establish a frequency range or ranges of the relevant crash signals so that extraneous signal components present in the crash acceleration signal can be filtered and frequencies indicative of a crash event passed for further processing.

The filtered output signals are provided to associated analog-to-digital ("A/D") converters that may be internal to the controller 50 (e.g., an A/D input of a microcomputer) or an external A/D converter. The A/D converters convert the filtered crash acceleration signals into digital signals. The output of the A/D converters are filtered preferably using high-pass/low-pass filters having values empirically determined for the purpose of eliminating small drifts and offsets resulting from the conversion. In a microcomputer embodiment of the present invention, the filters would be digitally implemented within the microcomputer. The filtering functions provide filtered acceleration signals CZS_3X and CZS_3Y.

The controller 50 determines acceleration values designated A_MA_CZS_3X and A_MA_CZS_3Y. These values are determined by calculating moving average values of the associated filtered acceleration signals from the crush-zone sensors 40, 41, respectively. A moving average is a sum of the last predetermined number of samples of the filtered acceleration signal. The average is updated by removing the oldest value, replacing it with the latest sample, and then determining the new average.

The determined crush-zone sensor acceleration value A_MA_CZS_3X as a function of the determined displacement value Displ_Rel_1X is compared against an asymmetric CZS_3X threshold 220, and a special mapping segment threshold 222 in a threshold comparison function 226. The threshold 222 and the threshold 220 vary as a function of Displ_Rel_1X in a predetermined manner to achieve the desired control. The thresholds may be determined empirically for a particular vehicle platform of interest. The result of the comparison function 226 is output to the ORing function 230.

The determined crush-zone sensor acceleration value A_MA_CZS_3Y as a function of the determined displacement value Displ_Rel_1X is compared against an asymmetric CZS_3Y threshold 232 and a special mapping segment threshold 234 in a threshold comparison function 236. The threshold 232 and the threshold 236 vary as a function of Displ_Rel_1X in a predetermined manner to achieve the desired control. The thresholds may be determined empirically for a particular vehicle platform of interest. The result of the comparison function 236 is output to the ORing function 230.

The crush-zone sensors 42 and 43 are preferably accelerometers providing a signal CZS_4X and CZS_4Y, respectively, having characteristics (e.g., frequency and amplitude) indicative of the vehicle's crash acceleration in the X and Y directions, respectively, upon the occurrence of a crash event as sensed at the forward, front right location of the vehicle. The acceleration signal CZS_4X is filtered by, preferably, a hardware high-pass-filter ("HPF")/low pass filter ("LPF") 60 to eliminate frequencies resulting from extraneous vehicle operating events and/or inputs resulting from road noise. Similarly, the acceleration signal CZS_4Y is filtered by, preferably, a hardware high-pass-filter ("HPF")/low pass filter ("LPF") 61 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing.

The filtered output signals are provided to associated analog-to-digital ("A/D") converters that may be internal to the controller 50 (e.g., an A/D input of a microcomputer) or an external A/D converter. The A/D converters convert the filtered crash acceleration signals into digital signals. The output of the A/D converters are filtered preferably with high-pass/low-pass filters having filter values empirically determined for the purpose of eliminating small drifts and offsets resulting from the conversions. In a microcomputer embodiment of the present invention, the filters would be digitally implemented within the microcomputer. The filtering functions output filtered acceleration signals CZS_4X and CZS_4Y.

The controller 50 determines acceleration values designated A_MA_CZS_4X and A_MA_CZS_4Y from CZS_4X and CZS_4Y, respectively. These values are determined by calculating moving average values of the filtered acceleration signals of the crush-zone sensors 42 and 43, respectively. A moving average is a sum of the last predetermined number of samples of the filtered acceleration signal. The average is updated by removing the oldest value, replacing it with the latest sample, and then determining the new average.

This determined crush-zone sensor acceleration value A_MA_CZS_4X as a function of the determined displacement value Displ_Rel_1X is compared against an asymmetric CZS_4X threshold 250 and a special-mapping 252 in a threshold comparison function 256 of the controller 50. The threshold 252 and the threshold 250 vary as a function of Displ_Rel_1X in a predetermined manner to achieve the desired control. The values may be determined empirically for a particular vehicle platform of interest. The result of the comparison from the comparison function 256 is an input to the ORing function 230.

The determined crush-zone sensor acceleration value A_MA_CZS_4Y as a function of the determined displacement value Displ_Rel_1X is compared against an asymmetric CZS_4Y threshold 262, and a special mapping segment threshold 264 in a threshold comparison function 266. The threshold 262 and the threshold 266 vary as a function of Displ_Rel_1X in a predetermined manner to achieve the desired control. The thresholds may be determined empirically for a particular vehicle platform of interest. The result of the comparison function 266 is output to the ORing function 230.

With the ORing function 230, the controller 50 controls which threshold 130 or 132 is used to actuate the first stage deployment. If none of the determined values A_MA_CZS_3X, A_MA_CZS_3Y, A_MA_CZS_4X, OR A_MA_CZS_4Y cross their associated thresholds 220 (Asymmetric CZS_3X Segment), 232 (Asymmetric CZS_3Y Segment), 250 (Asymmetric CZS_4X Segment), OR 262 (Asymmetric CZS_4Y Segment), then threshold 130 is used. If any of them cross their associated thresholds, then the threshold 132 is used. The threshold 130 is also referred to herein as the Symmetric CCU $1^{st}$ Stage Threshold. The threshold 132 is also referred to herein as the Asymmetric CCU $1^{st}$ Stage Threshold.

Referring to FIG. 5, the logic control used by controller 50 is depicted to initiate a first stage deployment. As can be seen, if any of the CZS_3X OR CZS_4X OR CZS_3Y OR CZS_4Y $1^{st}$ stage segment values are exceed, a HIGH logic value will result from ORing function 230. The CCU_1X value is also determined whether the Vel_Rel_1X versus Displ_Rel_1X is outside of the misuse box shown in function 124 which defines values below which a no-deployment condition exists. Assuming CCU_1X values result in Vel and Disp values outside of the misuse box, i.e., the misuse box values are exceeded, AND CCU $1^{st}$ stage Asymmetric value has been exceeded or the CCU $1^{st}$ stage Symmetric CCU has been exceed by CCU_1X, the first stage 94 of the multistage air bag is deployed. Second stage deployment is based on the time for crossing the second threshold 134 and the inflator mapping shown in FIG. 6.

Figure 6:
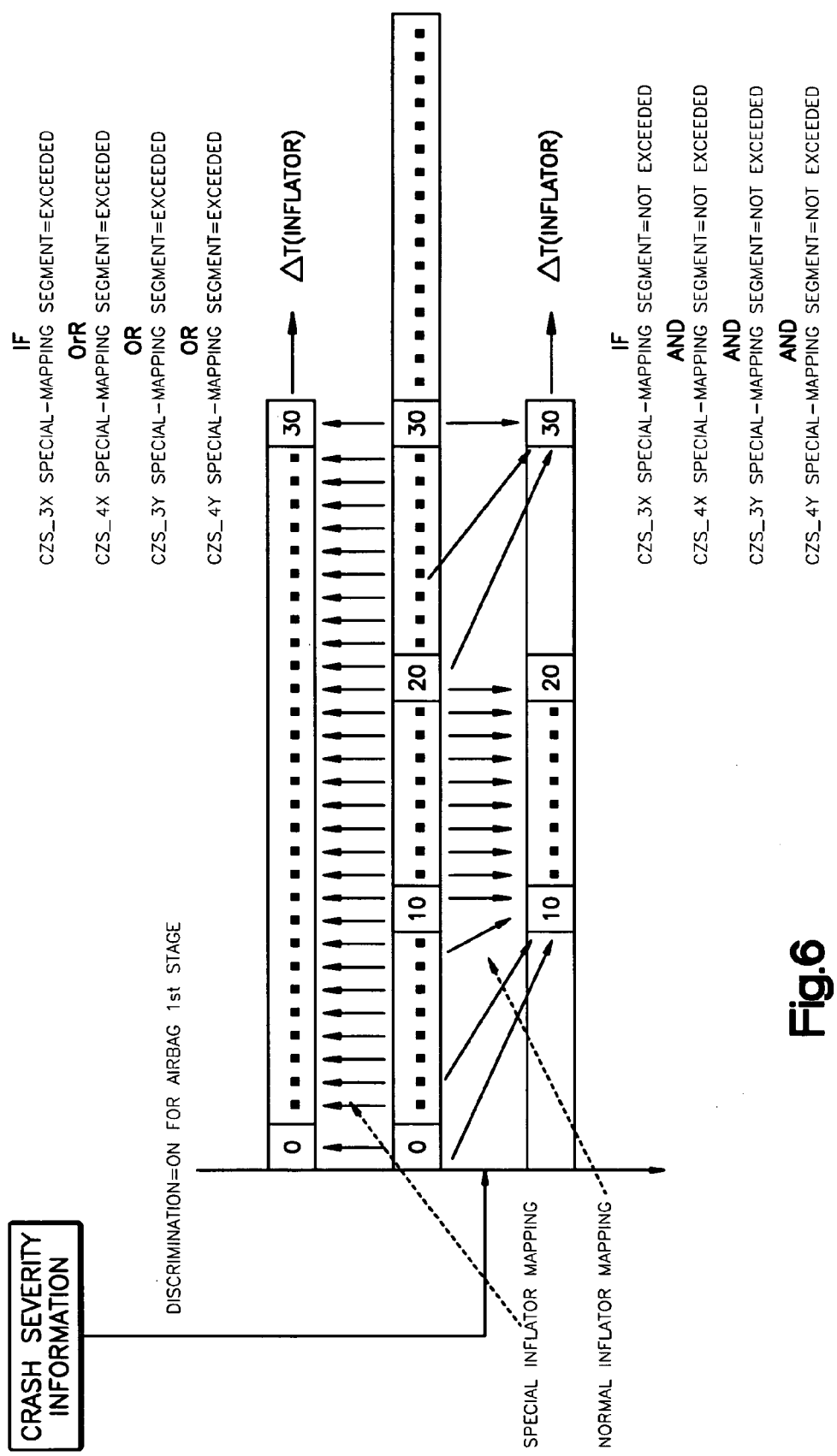
FIG. 6 is a diagram showing the inflator mapping in accordance with the present invention.

Referring to FIG. 6, mapping for control of second stage deployment is shown for an exemplary embodiment of the present invention. Two inflator mappings exist. A normal inflator map and a special inflator map. As to which map is used is controlled by the CZS values and the comparisons in functions 226, 236, 256, and 266. If all of the A_MA_CZS_3X, A_MA_CZS_3Y, A_MA_CZS_4X, OR A_MA_CZS_4Y values as a function of Disp_Rel_1X are below the special mapping thresholds 222, 234, 252, and 264, respectively, then the normal mapping is used. If any of the A_MA_CZS_3X, A_MA_CZS_3Y, A_MA_CZS_4X, OR A_MA_CZS_4Y values as a function of Disp_Rel_1X are greater than the special mapping thresholds 222, 234, 252, and 264, respectively, then the special mapping is used.

In the special-mapping, one-to-one timing occurs between the crossing of the second threshold and the deployment signal for the second actuation from 1-30 milliseconds. In the normal mapping, actuation of the second stage would occur 10 milliseconds after the first stage if the second threshold crossing was between 1-10 milliseconds of the first stage crossing, a one-to-one timing control between 10-20 milliseconds, and deployment 30 milliseconds after first deployment if the second crossing occurred between 21-30 milliseconds after the first stage deployment.

Other sensors 88 could be used to make further control adjustments. For example, if a rearward facing child seat is detected on the passenger's seat 84, actuation of the first and second stages 94, 96 could be prevented.

From the above description of the invention, those skilled in the art will perceive improvements, changes and modifications. Such improvements, changes, and/or modifications within the skill of the art are intended to be covered by the appended claims.

Having described the invention, the following is claimed:

1. An apparatus for controlling a vehicle actuatable occupant restraining system in a vehicle comprising:
   a central crash accelerometer at a central vehicle location sensing crash acceleration in a direction of a front-to-rear axis of the vehicle and providing a central crash acceleration signal indicative thereof;
   a crush zone crash accelerometer at a forward location of the vehicle sensing transverse crash acceleration in a direction transverse to the front-to-rear axis of the vehicle and providing a transverse crash acceleration signal indicative thereof; and
   a controller actuating the actuatable occupant restraining system in response to the central crash acceleration signal and the transverse crash acceleration signal, said controller determining a crash velocity value from said central crash acceleration signal and actuating said actuatable occupant restraining system by comparing said crash velocity value against a first velocity threshold function when said transverse crash acceleration signal from said crush zone crash accelerometer is at a first value and actuating said actuatable occupant restraining system by comparing said crash velocity value against a second velocity threshold function when said transverse crash acceleration signal from said crush zone crash accelerometer is at a second value.

2. The apparatus of claim 1 wherein said vehicle actuatable restraining system is a multistage occupant restraining device and said controller adjusts deployment criteria of actuation of a first stage of said multistage occupant restraining device in response to said transverse crash acceleration signal from the crush zone crash accelerometer.

3. The apparatus of claim 1 wherein the crush zone crash accelerometer is one of at least two laterally spaced crush zone crash accelerometers spaced on opposite vehicle sides for sensing transverse crash acceleration at associated forward locations of the vehicle and providing associated crush zone transverse crash acceleration signals, the controller actuating the actuatable occupant restraining system in response to the central crash acceleration signal and the associated transverse crash zone crash acceleration signals from the crush zone crash accelerometers.

4. An apparatus for controlling a vehicle actuatable occupant restraining system in a vehicle comprising:
   a central crash accelerometer at a central vehicle location sensing crash acceleration in a direction of a front-to-rear axis of the vehicle and providing a central crash acceleration signal indicative thereof;
   a crush zone crash accelerometer at a forward location of the vehicle sensing transverse crash acceleration in a direction transverse to the front-to-rear axis of the vehicle and providing a transverse crash acceleration signal indicative thereof; and
   a controller actuating the actuatable occupant restraining system in response to the central crash acceleration signal and the transverse crash acceleration signal, said controller determining a crash velocity value and a crash displacement value from said central crash acceleration signal and actuates actuating said actuatable occupant restraining system as a first function of said crash velocity value as a function of crash displacement when said transverse crash acceleration signal from said crush zone crash accelerometer is at a first value and actuating said actuatable occupant restraining system as a second function of said crash velocity value as a function of crash displacement when said transverse crash acceleration signal from said crush zone crash accelerometer is at a second value.

5. The apparatus of claim 4 wherein said vehicle actuatable restraining system is a multistage occupant restraining device and said controller adjusts deployment criteria of actuation of a first stage of said multistage occupant restraining device in response to said transverse crash acceleration signal from the crush zone crash accelerometer as a function of crash displacement determined from said central crash acceleration signal from said central crash accelerometer.

6. The apparatus of claim 4 wherein the crush zone crash accelerometer is one of at least two laterally spaced crush zone crash accelerometers spaced on opposite vehicle sides for sensing transverse crash acceleration at associated forward locations of the vehicle and providing associated crush zone transverse crash acceleration signals, the controller actuating the actuatable occupant restraining system in response to the central crash acceleration signal and the associated crush zone transverse crash acceleration signals from the crush zone crash accelerometers.

7. A method for controlling a vehicle actuatable occupant restraining system in a vehicle comprising the steps of:
   sensing crash acceleration in a direction of the front-to-rear axis of the vehicle at a central vehicle location;
   sensing transverse crash acceleration in a direction transverse to the front-to-rear axis at a forward location of the vehicle; and
   actuating the actuatable occupant restraining system in response to the sensed central crash acceleration and the sensed transverse crash acceleration by determining a crash velocity value from said sensed central crash acceleration and actuating said actuatable occupant restraining system as a first function of said crash velocity value when said sensed transverse crash acceleration is at a first value and actuating said actuatable occupant restraining system as a second function of said crash velocity value when said sensed transverse crash acceleration is at a second value.

8. A method for controlling a vehicle actuatable occupant restraining system in a vehicle comprising the steps of:
   sensing crash acceleration in a direction of a front-to-rear axis of the vehicle at a central vehicle location;
   sensing transverse crash acceleration in a direction transverse to the front-to-rear axis at a forward location of the vehicle; and
   actuating the actuatable occupant restraining system in response to the sensed central crash acceleration and the sensed transverse crash acceleration by determining a crash velocity value and a crash displacement value from said sensed central crash acceleration and actuating said actuatable occupant restraining system as a first function of said crash velocity value as a function of crash displacement when said sensed transverse crash acceleration is at a first value and actuating said actuatable occupant restraining system as a second function of said crash velocity value as a function of crash displacement when said sensed transverse crash acceleration is at a second value.

* * * * *